United States Patent [19]

Edelman

[11] Patent Number: 5,005,962

[45] Date of Patent: Apr. 9, 1991

[54] REARVIEW MIRROR

[76] Inventor: Karl W. Edelman, 45 Winter St., Hopkinton, Mass. 01748

[21] Appl. No.: 505,603

[22] Filed: Apr. 6, 1990

Related U.S. Application Data

[63] Continuation-in-part of Ser. No. 391,433, Aug. 10, 1989, abandoned.

[51] Int. Cl.$^5$ ............................................. G02B 5/10
[52] U.S. Cl. ..................................... 350/625; 350/627
[58] Field of Search ............... 350/612, 616, 625, 627, 350/629

[56] References Cited

U.S. PATENT DOCUMENTS 2,857,810  10/1958  Troendle ........................... 350/629
4,331,382   5/1982  Graff ................................. 350/627

FOREIGN PATENT DOCUMENTS 0210757  2/1987  European Pat. Off. ........... 350/625
3147945  9/1982  Fed. Rep. of Germany ...... 350/629
55-110638  8/1980  Japan .................................. 350/625
2048189  12/1980  United Kingdom ............... 350/625

Primary Examiner—Paul M. Dzierzynski
Assistant Examiner—J. P. Ryan
Attorney, Agent, or Firm—Wolf, Greenfield & Sacks

[57] ABSTRACT

A rearview mirror conventional in appearance but which allows a vehicle operator to see the "blind spot" that is associated with conventional mirrors. A concave area is on the back surface of the mirror, which when viewed from the front of the mirror is a convex area, and the area has a constant rate of convexity. The concave area is disposed outwardly of the remainder of the mirror, which has a flat reflective surface. The instantaneous transfer of images from the flat to the convex area eliminates distortion of the object being viewed. The mirror may have a backer for protecting the reflective surface and for facilitating securing the mirror in a conventional rearview mirror frame.

13 Claims, 2 Drawing Sheets

REARVIEW MIRROR

The present application is a continuation-in part of U.S. patent application Ser. No. 07/391,933, filed Aug. 10, 1989 now abandoned and which is incorporated herein by reference.

FIELD OF THE INVENTION

This invention relates to a rearview mirror for vehicles, and more particularly is directed toward a rearview mirror positioned outside the operator's window.

BACKGROUND OF THE INVENTION

Rearview mirrors are essential for the safe operation of motor vehicles. Ordinary flat rearview mirrors are known to have a "blind spot" which is located adjacent the vehicle and to the rear of the driver. The "blind spots" frequently lead to accidents particularly when the driver changes lanes.

An obvious solution to the "blind spot" problem is to have the rearview mirror outside the car adjusted to capture the "blind spot" area. To compensate for the missing field of view in the outside mirror, one may adjust the mirror inside the car. This requires the outside rearview mirror to be angled such that none of the driver's car is in the field of view. Since the view through the outside mirror when in that position does not show the relationship of the driver's car to the field of view, few drivers employ this method. Most drivers place the outside mirror at an angle which encompasses the side or rear of his or her car.

There have been many other attempts to solve the "blind spot" problem. Truck drivers, for example, use a mirrored hemisphere placed on the rearview mirror with the hemisphere's convex side exposed. Because trucks normally have large mirrors, the mirrored hemisphere solution often suffices. This method, however, should not be used on cars with conventional rearview mirrors because the hemisphere is aesthetically displeasing, distracting, and takes up too much of the total area of the flat section of the mirror so that it is unable to properly function.

Much work has been done in this field, and relevant patents of which the applicant is aware are U.S. Pat. Nos. 3,175,463 issued Mar. 30, 1965, 3,389,952 issued June 25, 1968, and 4,306,770 issued Dec. 22, 1981, German Patent No. 2,213,586 issued Oct. 4, 1973, and European Patent No. 210,757 published Feb. 4, 1987. Of these the European patent is the most relevant. However, the rearview mirror of that patent includes a slopinq section between and joining a flat section to a convex area of changing curvature. The convex area of changing curvature creates continual distortion as the object is viewed in the mirror moves away from the flat section further into the convex area. The patent indirectly mentions that a convex section with a constant rate of curvature can be used, but the sloping section remains. The reason that the device of the European patent produces too much distortion in the area of constant rate of convexity is because of the gradual slope leading into the convex area. Elimination of this slopinq area is very important since any sloping creates distortion in the form of narrowing and shrinking objects.

SUMMARY OF THE INVENTION

One important object of the present invention is to provide a rearview mirror having a flat front surface that can capture the "blind spot" with no distortion of the field of view.

It is a further object of the present invention to provide a rearview mirror made of a single piece of plastic or glass or other transparent material and containing a convex section of a constant radius of curvature.

It is a further object of the present invention to provide a rearview mirror having an instantaneous change from a flat surface area to a convex area of constant radius.

It is a further object of the present invention to provide a rearview mirror having a convex area that produces a reflected image which has a constant height and width when viewed within the convex area.

It is a further object of the present invention to provide a rearview mirror that may be secured within a conventional rearview mirror frame in a manner similar to conventional rearview mirrors.

In the preferred embodiment of this invention, the foregoing objects and advantages are achieved by a rearview mirror utilizing a single piece of plastic, glass or similar material that has a flat front face. The back of the material has a flat section and a concave section of constant curvature immediately adjacent thereto without an intervening slope. The material is mirrored such as by silvering the back surface. A material such as foam or plastic may be placed on the back of the plastic, glass or other material to facilitate mounting of the mirror in a standard rearview mirror frame, although it may not be necessary.

DETAILED DESCRIPTION OF THE DRAWINGS

Figure 4:
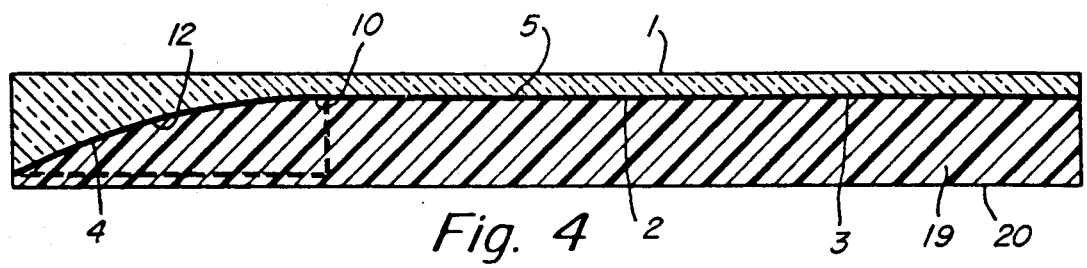
FIG. 4 is a cross section of the mirror blank taken along section line 4—4 in FIG. 2 and also showing an optional backing material applied to it.
Figure 5:
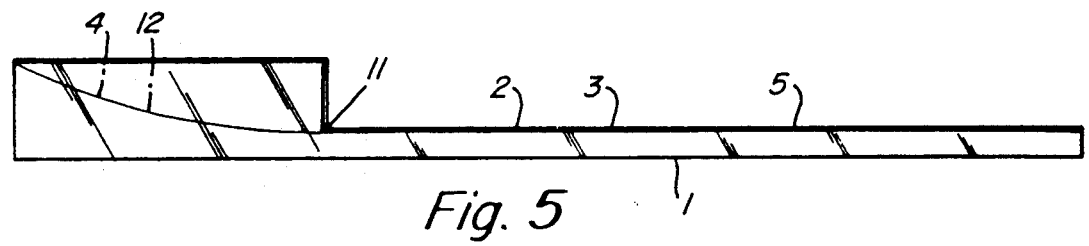
FIG. 5 is a top view of a mirror blank.
Figure 6:
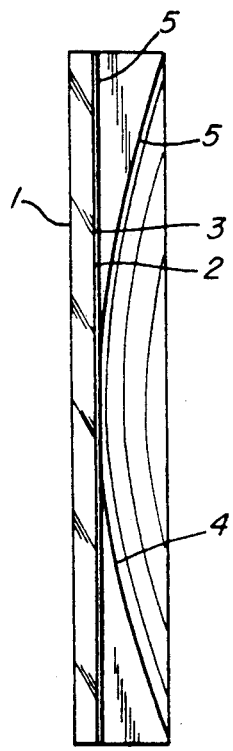
FIG. 6 is a right end view thereof.

Referring to the drawings, the mirror shown is a single continuous piece of plastic, glass or similar material having a flat front face 1 and a back face 2. The back face 2 consists of a flat section 3 and, when viewed from the back, a convex area 4 of constant curvature. The plastic, glass or similar material is mirrored typically by a coating 5 such as silver or other reflective material applied to the back face 2. The highest point 10 of the convex area 4 (when viewed from the front) is in the same plane as the back flat section 3 as shown in FIG. 4. A transition line 11 is shown at the junction of the flat bottom section 3 and convex area 4.

Figure 2:
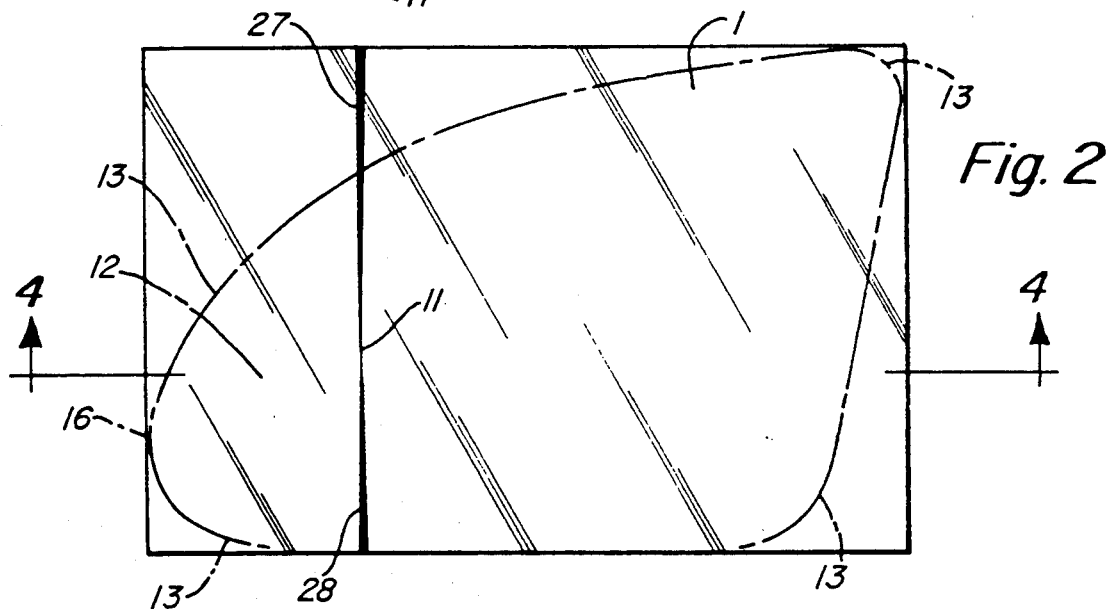
FIG. 2 is a front view of a rearview mirror blank from which the mirror of FIG. 1 is made and suggesting in broken lines the ultimate shape.
Figure 3:
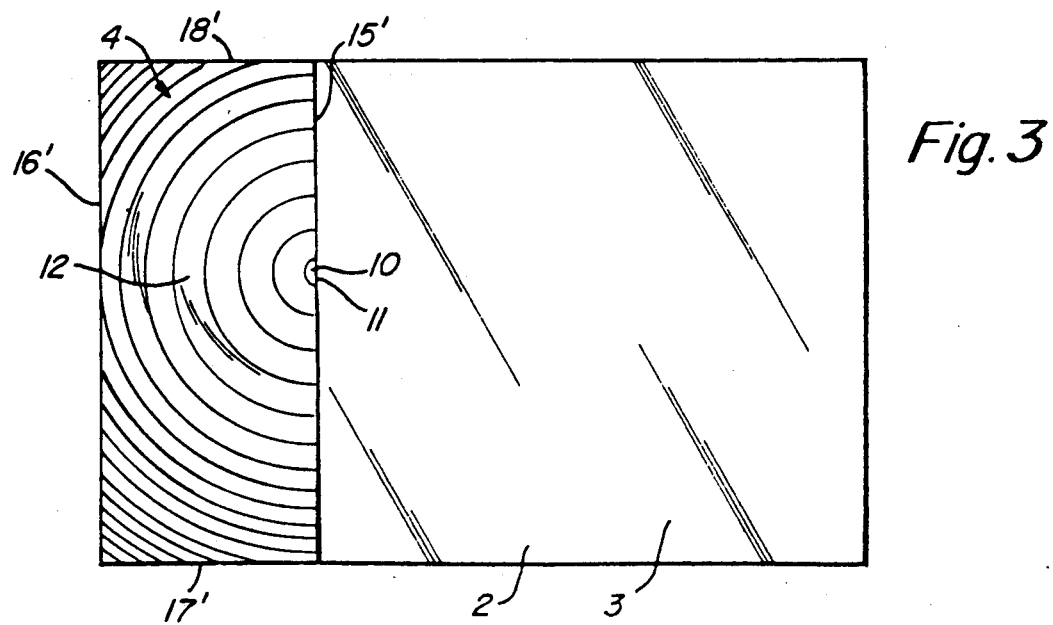
FIG. 3 is a rear view of a mirror blank of FIG. 2.

The shape of the rearview mirror will in part be dictated by the size of the convex area used. The mirror may either be molded initially into the desired shape, or be molded as a rectangular mirror blank and thereafter cut according to the shape of the rearview mirror frame to be used. An example of a particular rearview mirror shape is represented by the dotted line 13 in FIG. 2. The highest point 10 of the convex area 4 (as viewed from the front) will not be the center 12 of the convex area because of the oblique angle at which the rearview mirror is aligned. The highest point 10 is normally closely adjacent the transition line 11 as suggested in FIGS. 3 and 4. Due to the difference in position between the highest point 10 and the center 12 of the convex area, and the nonsymmetrical shape of most rearview mirror frames, the sides of the convex area 15, 16, 17 and 18 of the final shape are usually not the same dimensions. Sides 15', 16', 17', and 18' of the convex area before cutting the mirror to shape are shown in FIG. 3.

Figure 1:
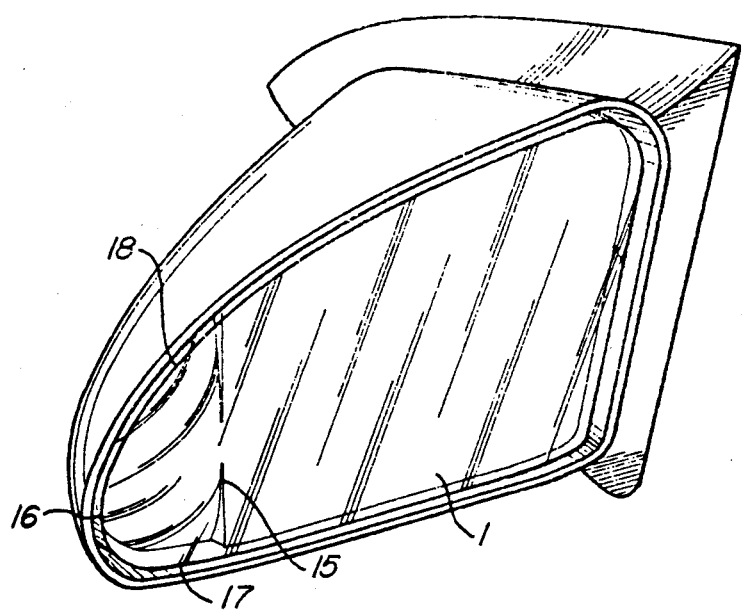
FIG. 1 is a rearview mirror constructed in accordance with this invention and mounted in a typical rearview mirror frame.

In FIG. 4 a backer 19 is shown disposed on the back face 2 of the material. When a backer 19 is used, it will serve to protect the coating 5 on the back face 2 of the mirror, and it may also facilitate the mounting of the mirror in a frame such as shown in FIG. 1. Typically the back surface 20 of the material 19 would be smooth and flat to enable conventional mounting methods such as glue or a snap in system to be used. The material 19 may be foam, plastic, or any other similar material. In many instances, however, depending on the frame configuration, no backing is called for, and the mirror itself may be attached by double face adhesive tape or other well known material to posts (not shown) in the frame.

When the rearview mirror of this invention is used, a car viewed in the flat area 3 appears as any car does in a conventional flat rearview mirror. As the car moves toward the "blind spot", the car image travels outwardly across the mirror face toward the convex area 4. However, when the car enters the "blind spot", its image may be seen only in the convex section 4. The vehicle looks farther away than it did when viewed in the flat section 1, but the vehicle does not appear distorted because the convex area has a constant rate of curvature.

Because an image reflected by the convex section 4 of the mirror appears further away than when viewed in the flat section 3, it may be desirable to provide the mirror with a clear reference so that the driver may immediately recognize in what section of the mirror the image is being viewed. For that purpose dark arrows 27 and 28 may be provided at the transition line 11. This feature would be particularly beneficial when an object initially enters the field of view of the mirror at the outer edge 16 thereof.

In the preferred embodiment the mirror of the present invention in made from plastic and can be produced by an injection molding process. The plastic mirror can be produced more easily and less expensively than a glass mirror, which requires the convex section be ground out to form back face 2.

Having described this invention in detail, those skilled in the art will appreciate that numerous modifications of the invention may be made without departing from the spirit of the invention. For example, other types of reflective glass may be used such as two way glass. Therefore, the scope of the invention is not to be limited to the single embodiment illustrated and described. Rather its scope is to be determined by the appended claims and their equivalents.

I claim:

1. A rearview mirror comprising:
    a one piece sheet having a flat front face and a back face;
    said back face having a flat section and a convex section when viewed from the front face,
    and a reflective coating covering the back face, wherein the convex section is a spherical surface and the highest point on the spherical surface is adjacent to the plane of the flat section.

2. A rearview mirror as set forth in claim 1, wherein the convex section is immediately adjacent the flat section.

3. A rearview mirror as set forth in claim 2, wherein the highest point of the spherical surface is in the plane of the flat section.

4. A rearview mirror as set forth in claim 3, wherein a backer face is attached to the back face for protecting the coating and for facilitating easy mounting of the rearview mirror in a frame.

5. A rearview mirror as set forth in claim 1, wherein a backer face is attached to the back face for protecting the coating and for facilitating easy mounting of the rearview mirror in a frame.

6. A rearview mirror as set forth in claim 1, wherein the one piece sheet is plastic.

7. A rearview mirror as set forth in claim 1, wherein the one piece sheet is glass.

8. A rearview mirror comprising:
    a one piece mirror having a flat reflective surface and a convex reflective surface when viewed from the front of the mirror, said convex reflective surface lying immediately adjacent the flat reflective surface; said convex surface being a spherical surface with the highest point of the spherical surface lying immediately adjacent the flat surface.

9. A rearview mirror as set forth in claim 8, wherein said mirror has a flat front surface parallel to the flat reflective surface.

10. A rearview mirror as set forth in claim 9, wherein a reference marking is provided on the mirror to indicate the line of demarcation between the flat and convex reflective surfaces.

11. A rearview mirror as set forth in claim 8, wherein the highest point of the spherical surface lies in the plane of the flat reflective surface.

12. A rearview mirror as set forth in claim 8, wherein the one piece mirror is plastic.

13. A rearview mirror as set forth in claim 9, wherein the one piece mirror is glass.

* * * * *